(No Model.)

C. J. MIKESH.
CORN PLANTER.

No. 295,268. Patented Mar. 18, 1884.

WITNESSES:

INVENTOR:
C. J. Mikesh

BY Munn & Co.
ATTORNEYS.

UNITED STATES PATENT OFFICE.

CHARLES J. MIKESH, OF RUTHVEN, IOWA.

CORN-PLANTER.

SPECIFICATION forming part of Letters Patent No. 295,268, dated March 18, 1884.

Application filed September 10, 1883. (No model.)

*To all whom it may concern:*

Be it known that I, CHARLES J. MIKESH, of Ruthven, in the county of Palo Alto and State of Iowa, have invented certain new and useful Improvements in Corn-Planters, of which the following is a full, clear, and exact description.

Reference is to be had to the accompanying drawings, forming part of this specification, in which similar letters of reference indicate corresponding parts in all the figures.

Figure 1:
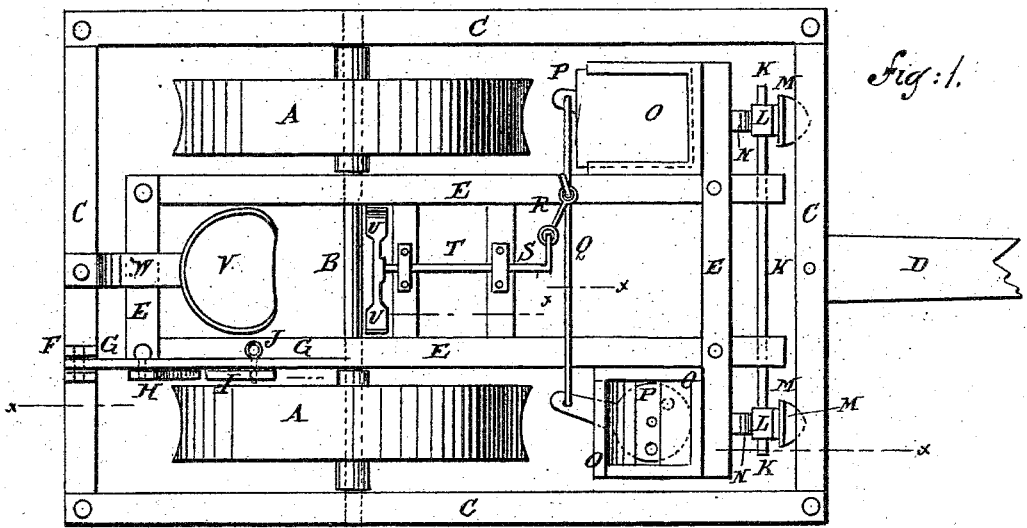
Figure 2:
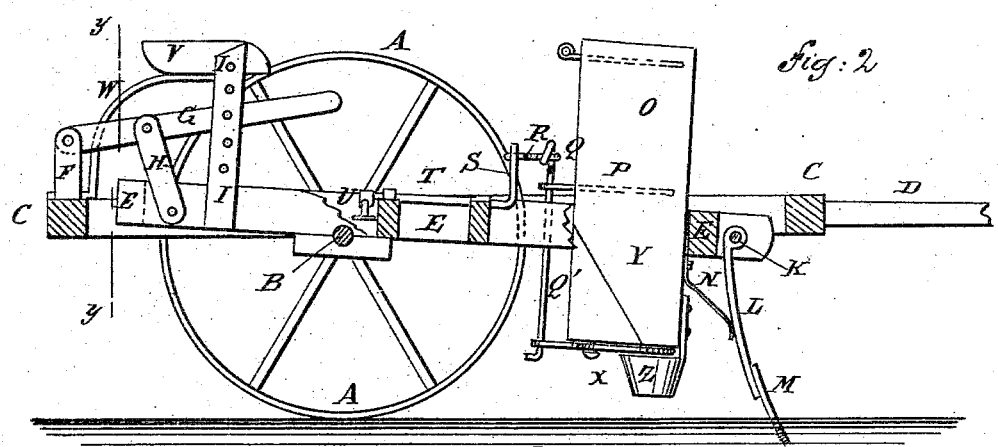
Figure 3:
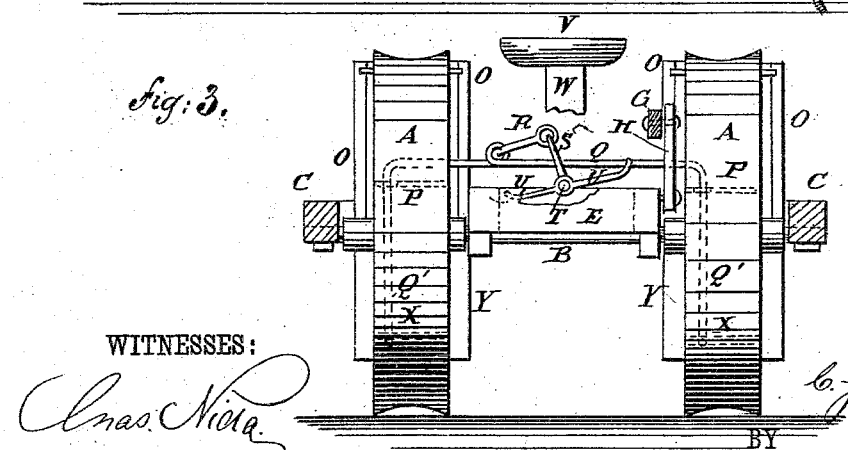

Figure 1 is a plan view of my improvement. Fig. 2 is a sectional side elevation of the same, taken through the broken line *x x x x*, Fig. 1. Fig. 3 is a sectional rear elevation of the same, taken through the line *y y*, Fig. 2.

The object of this invention is to facilitate the operation of corn-planting, and also to promote convenience in controlling and operating the planters.

The invention consists of the combination and arrangement of parts, substantially as hereinafter fully set forth and claimed.

A represents the wheels, which are made with wide concaved rims to adapt them to cover the seed. The axle B of the wheels A is attached at its ends to the side bars of the outer frame, C, which incloses the machine, and to the forward end of which is rigidly attached the tongue D.

E is the inner frame, which is made of such a width as to fit in between the hubs of the wheels A and ride upon the axle B, with which it is connected by bearings attached to the side bars of the said frame E. The frame E is made of such a length as to oscillate freely between the cross-bars of the outer frame, C.

To a support, F, attached to the rear cross-bar of the frame C, is pivoted the rear end of a lever, G, to which, at a little distance from its rear end, is pivoted the upper end of the connecting-bar H. The lower end of the bar H is pivoted to the rear end of a side bar of the frame E, so that the said frame E can be oscillated by operating the lever G. The forward part of the lever G moves along an upright bar, I, the lower end of which is rigidly attached to a side bar of the frame E. Several holes are formed through the upright I to receive a pin, J, which also passes through a hole in the lever G, to hold the said lever G and the frame E securely in any position into which they may be adjusted. With this construction, by operating the lever G, the frame E can be adjusted into proper position for traveling uphill and downhill, and to raise the furrow-opening plows away from the ground.

To the forward ends of the side bars of the frame E is attached a rod, K, the ends of which project and pass through eyes in the upper ends of the standards L. To the lower ends of the standards L are attached plows M, to open furrows to receive the seed. The standards L are supported against the draft-strain by springs N, attached to the frame E, and which bear against the rear side of the said standards, so that should the plows M strike a stone the said standards will swing back to prevent the said plows from being broken. The front cross-bar of the frame E is extended nearly to the side bars of the frame C, and to the projecting parts of the said cross-bar are attached the seed-boxes O.

P are the seed-dropping slides, which may be arranged to vibrate upon a pivot, as shown in Fig. 1, or to slide longitudinally, as may be desired. The two seed-dropping slides P are connected by a rod, Q, with which is connected, by a link or short rod, R, the end of the upwardly-projecting arm S, formed upon or rigidly attached to the forward end of a short shaft, T. The shaft T rocks in bearings attached to cross-bars of the frame E, and to the rear end of the said shaft is rigidly attached the center of a cross-bar, U, which is arranged at right angles with the arm S, and in such a position that the driver, while sitting upon the seat V, can rest his feet upon the ends of the said cross-bar, and can thus operate the seed-dropping slides with his feet.

The driver's seat V is attached to the upper end of a spring-standard, W, the lower end of which is attached to the rear cross-bar of the frame C.

The ends Q' of the rod Q, that are connected with the seed-dropping slides P, are extended downward vertically, and their lower ends are connected with the slides X, similar to the slides P, and similarly arranged. The slides X are connected with the downward extensions Y of the seed-boxes O, or with spouts connected with the said seed-boxes. The slides X are designed to receive the seed from the slides P, and at the next movement of the seed-dropping mechanism drop the said seed in a bunch through the funnels Z to the ground. The funnels Z are tapered, as shown in Fig. 2, to prevent the seed from scattering while falling from the slides X to the ground.

Having thus described my invention, I claim as new and desire to secure by Letters Patent—

1. In a corn-planter, the combination, with the spouts Y, the seed-dropping slides P, and the arms Q', of the inverted approximately U-shaped rod Q of the seed-dropping slides X, and the funnels Z, substantially as herein shown and described.

2. In a corn-planter, the rock-shaft T, having arm S and cross-bar U, inverted approximately U-shaped rod Q, having arms Q', and the slides P of the seed-spouts Y, in combination with the slides X and the funnels Z, substantially as and for the purpose set forth.

3. In a corn-planter, the rock-shaft T, having the upwardly-projecting arms S, link R, inverted approximately U-shaped rod Q, having downwardly-projecting arms Q', the slides P of the seed-spouts Y, the slides X, and the funnels Z, substantially as and for the purpose set forth.

CHARLES J. MIKESH.

Witnesses:
THOMAS W. THOMPSON,
E. F. KOVARIK.